(No Model.)
M. GRAHSER.
VELOCIPEDE.
No. 287,825. Patented Nov. 6, 1883.
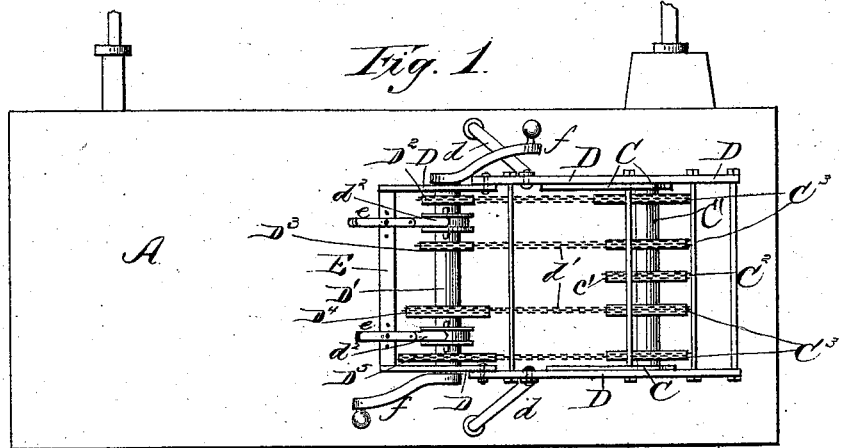
Fig. 1.
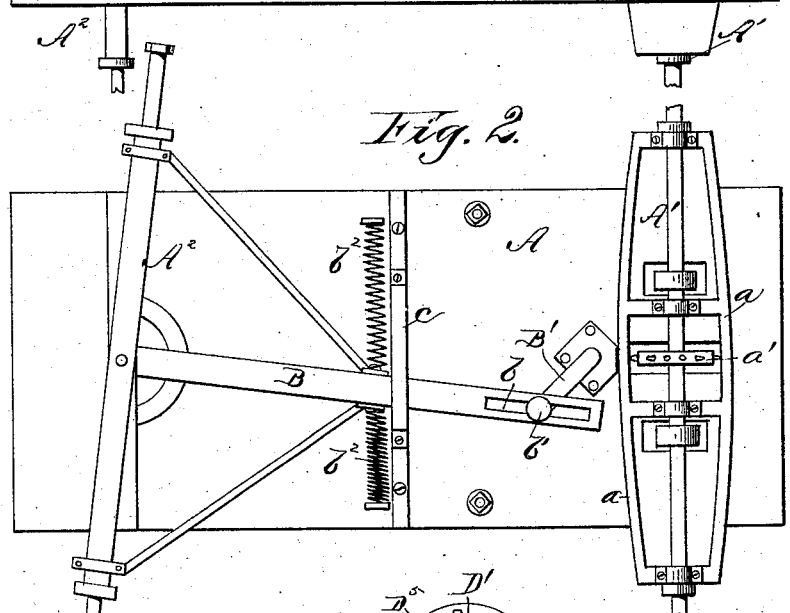
Fig. 2.
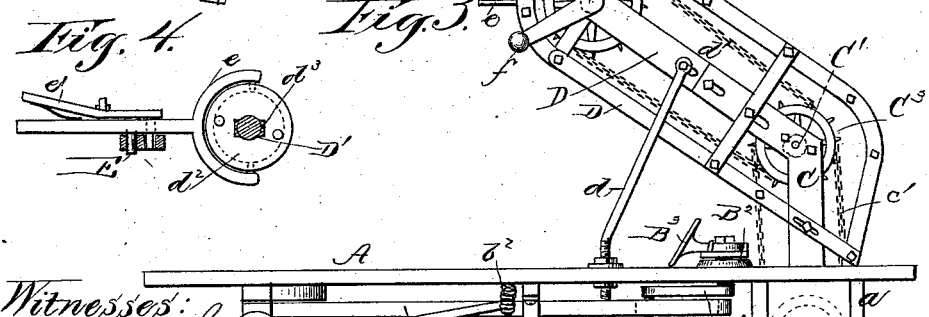
Fig. 3.
Fig. 4.
Witnesses:
Inventor:
Michael Grahser
per Attorney.

UNITED STATES PATENT OFFICE.

MICHAEL GRAHSER, OF CHICAGO, ILLINOIS.

VELOCIPEDE.

SPECIFICATION forming part of Letters Patent No. 287,825, dated November 6, 1883.

Application filed September 4, 1882. (No model.)

*To all whom it may concern:*

Be it known that I, MICHAEL GRAHSER, a citizen of the United States of America, residing at Chicago, in the county of Cook and State of Illinois, have invented an Improvement in Hand-Velocipedes, of which the following is a specification, to wit:

This invention relates to wagons or velocipedes operated by hand-power; and it consists in certain peculiarities of construction, whereby the power and speed may be increased or diminished at the will of the operator, as may be desirable for different kinds of road, substantially as will be more fully described hereinafter.

To enable others skilled in the art to which my invention relates to make and use the same, I will now proceed to describe its construction and operation, referring to the accompanying drawings, in which—

Figure 1 is a top plan view of my invention; Fig. 2, a bottom plan view; Fig. 3, a side elevation, and Fig. 4 a detail view of one of the clutches.

A represents a platform or bed mounted upon two axles, $A'$ $A^2$. The forward axle, $A'$, is journaled in a metal frame, $a$, under the bed A, and is provided in the center with a sprocket or chain wheel, $a'$, by which it is driven. The rear axle, $A^2$, is pivoted to the under side of the bed or body A, and has connected to it a reach, B, extending forward nearly to the frame $a$, and having its end slotted, as seen at $b$.

$B'$ is a crank pivoted in the body A, and having on its outer end a wrist-pin, $b'$, which works in the slot $b$ in the reach. The pivot of the crank $B'$, above the body A, is supplied with a rigid cross-head, $B^2$, having pivoted foot-pieces $B^3$ on either end, by means of which the crank is turned, thereby throwing the reach upon one side or the other to steer the vehicle. The reach is returned to its normal position by means of springs $b^2$ $b^2$, upon each side, secured to the bed or body A. To take the weight of the reach off the crank, and also to limit its swing, I provide the body A, upon the under side, with a strap or stirrup, $c$, passing laterally across beneath the reach, supporting it and limiting its movement.

The wheels upon the rear axle are loose, but those upon the forward or driving axle must be rigidly secured, so as to turn with it.

Secured to the bed, or passing through the bed and supported upon the forward axle, are two standards, C C, having their upper ends bent rearward at an angle, as seen in Fig. 3.

In these standards is journaled a shaft, $C'$, carrying in its center a sprocket-wheel, $C^2$, which is connected by a chain, $c'$, with the wheel upon the driving-axle $A'$. The shaft $C'$ also carries, near each end, a pair of similar wheels, $C^3$, one of which is larger than the others, for reasons presently understood.

Upon the standards C C, and carried at the same angle, is bolted a frame, D, by bolts passing through slots in both frame and standards. The upper end of this frame D is supported upon braces $d$, and carries a shaft, $D'$. Running loosely on this shaft are four sprocket or chain wheels, $D^2$ $D^3$ $D^4$ $D^5$, which increase in size in the order named, and are all connected by chains or belts $d'$ to the corresponding wheels, $C^3$, on the shaft $C'$. I prefer to arrange these wheels $D^2$ $D^3$ $D^4$ $D^5$ in pairs near the ends of their shaft, and place between them the clutch-wheels $d^2$, which are turned with the shaft, but left free to slide laterally by a feather, $d^3$, on the shaft, as seen in Fig. 4. These clutches are each provided upon their faces with small pins or projections, which enter corresponding holes in the sides of the sprocket-wheels.

To a cross-bar, E, on the frame D, I pivot two forked levers, $e$ $e$, connected to the clutch-wheels $d^2$, and provided with spring-latches $e'$ $e'$, engaging with a series of holes in the face of the bar E. The shaft $D'$ passes through the frame D, and its ends are provided with handles or cranks $f$ $f$, by which the device is driven by hand. When the operator wishes to climb a hill or pass over rough or very sandy roads, he throws the clutch into gear with the smallest wheel, $D^2$, and when the handles are turned, this wheel, being only one-half as large as its connecting-wheel on shaft $C'$, will make twice as many revolutions, but will give much greater power. If the hill is not very steep, or the road so rough, he throws the clutch the other way and engages the wheel $D^3$, gaining in speed at but a small loss in power by the increased size of his driving-wheel. Upon smooth and level roads, where little power is required, the other clutch is thrown into gear with the wheels $D^4$ or $D^5$, and a great gain in speed is the result.

A seat for the rider may be placed just in rear of the frame D, and seated here he places his foot on the foot-pieces $B^3$, to steer. Should the chains become loose or stretch out a little the bolts may be loosened and the frame drawn out upon the standards by means of the slots in the frame and standards.

The device described is inexpensive and simple, and, by enabling the operator to obtain a varying power and speed as the occasion may require, is adapted for use upon any kind of road.

Having thus fully described my invention, what I claim as new, and desire to secure by Letters Patent, is—

1. The combination, in a hand-velocipede, of the slotted frame D, carrying the shaft $D'$, and loose chain-wheels $D^2 D^3 D^4 D^5$, of varying sizes, and their clutches $d^2$, with the slotted standards C C, carrying chain-wheels $C^2 C^3$, connected to the axle, and also to the shaft $D'$, substantially as shown and described.

2. The combination, in a velocipede, of the platform or body A, pivoted axle $A^2$, having slotted reach B, crank $B'$, having wrist-pin $b'$, cross-head $B^2$, and foot-pieces $B^3 B^3$, and the springs $b^2 b^2$, adapted to bear on opposite sides of the reach, substantially as shown and described.

3. The combination, in a velocipede, of the platform or body A, having axle $A'$, provided with sprocket-wheel $a'$, the standards C C, adjustable frame D, shaft $C'$, journaled in the standards C, and carrying sprocket-wheels $C^2 C^3$, shaft $D'$, journaled in the frame D, and carrying several loose sprocket-wheels of varying sizes, and suitable connecting and operating mechanism.

In testimony whereof I affix my signature in presence of two witnesses.

MICHAEL GRAHSER.

Witnesses:
CHAS. KRESSMANN,
FRANK JOHNSON.